United States Patent [19]
Delauzun

[11] 3,852,016
[45] Dec. 3, 1974

[54] RETRACTABLE MANDREL FOR BULGING OUT AND FORMING AN ANNULAR PERIPHERAL GROOVE IN PLASTIC TUBES

[75] Inventor: Robert Delauzun, Ecully, France

[73] Assignee: Societe Anonyme: Seperef-TMP Societe Pour L'Equipement Des Reseaux En Comalisations De Matieres Plastiques, Quincieux, France

[22] Filed: Sept. 12, 1973

[21] Appl. No.: 396,570

[30] Foreign Application Priority Data
Sept. 15, 1972 France .............................. 72.32850

[52] U.S. Cl. ................. 425/393, 249/181, 249/185
[51] Int. Cl. ....................... B29c 17/00, B29d 23/00
[58] Field of Search .................... 425/393, 392, 427; 249/181, 183, 184, 185, 186

[56] References Cited
UNITED STATES PATENTS

| | | | |
|---|---|---|---|
| 627,093 | 6/1899 | Bonta | 249/181 X |
| 628,382 | 7/1899 | Barnett | 249/181 X |
| 693,571 | 2/1902 | Shaw | 249/181 X |
| 765,939 | 7/1904 | Rogier | 425/427 |
| 1,269,164 | 6/1918 | Davidson | 249/179 |
| 1,467,760 | 9/1923 | Horman | 249/181 |
| 3,704,978 | 12/1972 | Leier et al. | 425/393 |
| 3,732,054 | 5/1973 | Lyng | 425/393 |
| 3,749,543 | 7/1973 | Stansbury | 425/393 |
| 3,773,456 | 11/1973 | Salz | 425/393 X |
| 3,776,682 | 12/1973 | Parmann | 425/393 X |

FOREIGN PATENTS OR APPLICATIONS
15,525    8/1900    Great Britain .................... 249/181

Primary Examiner—J. Howard Flint, Jr.
Attorney, Agent, or Firm—Melville, Strasser, Foster & Hoffman

[57] ABSTRACT

A retractable mandrel enables bulging out and groove forming of tubes of plastic material having large diameters, for exaple 100–500 mm. The mandrel is mounted for axial displacement on a carriage and comprises a conical end piece with a frusto-conical tip for receiving a preheated plastic tube. The tube in bulged out on the cylindrical portion of the mandrel and the groove is formed by means of four sector members which in their forming position create complete circular forming rim which is trapezoidal in cross section. When the preheated tube is slid on to the mandrel the sector members are in their retracted position in which the sector members are folded over one another in pairs to each side of a line defined by a first pair of pivot pins displaceable in radial slots. A second pair of pivot pins are received in generally straight parallel slots along with the radial slots are milled in the bottom of a drum. A drive disc is driven by suitable means and mounted for rotation in the end piece and has an S-shaped groove which receives the ends of the second part of pivot pins for sliding movement therein. A spring biases the sector members to their retracted position. Abutment pins and finger cooperate for driving the sector members between retracted and operative positions.

5 Claims, 4 Drawing Figures

RETRACTABLE MANDREL FOR BULGING OUT AND FORMING AN ANNULAR PERIPHERAL GROOVE IN PLASTIC TUBES

The present invention relates to a retractable mandrel for the rapid bulging out and groove forming of plastic tubes.

Such a mandrel is more particularly intended to bulge out tubes of large internal diameters, for example 100–500 mm.

The mandrel according to the present invention comprises a shaft mounted on a carriage for translatory movement along the axis of the shaft, a cylindrical end piece with a frusto-conical tip being fixed to one end of the shaft and adapted to be introduced into the tube to be bulged out; a drum through the bottom of which said shaft passes and to which it is fixed for movement; four sector members together forming an entire circular rim of trapezoidal cross-section; the sector members pivoted in pairs about two diametrically opposed pivots inserted into milled radial slots in the bottom of the drum; pivot pins fixed at the diametrically opposed extremities of two of the sector-members, and passing through parallel slots also formed in the bottom of the drum received in grooves forming an S with portions extending from the centre of the shaft and milled in a drive disc adapted to be driven in rotation by suitable means, the grooves co-operating with the parallel slots in the bottom of the drum for causing, according to the direction of rotation of the disc, either the outward expanding movement of the four sector members for bulging and forming a groove in the tube, or retracting the sector members towards one another at both sides of the line passing through the pivots for the sector members.

Two of the sector members are provided with fingers or projections which bear against the abutment pins carried by the drive disc housed in the end piece and freely rotatable therein, a coil spring being received on the shaft and bearing at one of its ends against one of the abutment pins, its other end being engaged in a hole in the end piece, the spring urging the four sector members to their retracted position.

The rotation of the drive disc is ensured by a sleeve fixed to said disc, a gear wheel keyed to the sleeve and meshing with a gear rack driven by a hydraulic or pneumatic jack.

Translatory movement of the spindle is effected by a pneumatic or hydraulic jack effecting the insertion and withdrawal of the mandrel into and out of the tube.

An embodiment of the mandrel is described hereinafter by way of a non-limiting example with reference to the accompanying drawings, in which.

Figure 1:
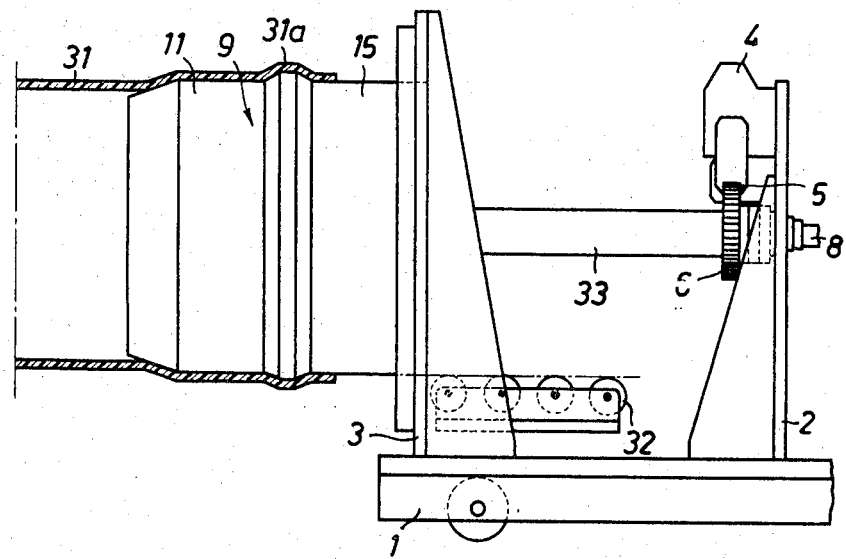
FIG. 1 shows the entire apparatus for bulging out the end of a tube.

The mandrel according to the present invention is a part of apparatus for bulging out the ends of tubes comprising a carriage 1 (FIG. 1) carrying two frame members 2 and 3.

The frame member 2 supports a jack 4 having a piston provided with a gear rack 5 meshing with a gear wheel 6 keyed to a horizontal sleeve 33 surrounding the shaft 7. The unit formed by the sleeve 33 and the shaft 7 is coupled to the piston rod 8 of a jack (not illustrated) for effecting the translatory movement of this unit in bearings carried by the frame member 2, the gear wheel 6 being keyed for longitudinal sliding movement on the sleeve 33.

A mandrel 9 is carried at the end of the shaft 7 which is guided in the frame member 3 as well as by the rollers 32 when the jack for translatory movement displaces the unit comprising the sleeve 33 and the shaft 7 longitudinally.

The mandrel 9 (FIG. 2) comprises a cylindrical end piece 11 with a frusto-conical tip secured at the end of the shaft 7 with a nut 12 and fixed for movement therewith by key 13.

Figure 2:
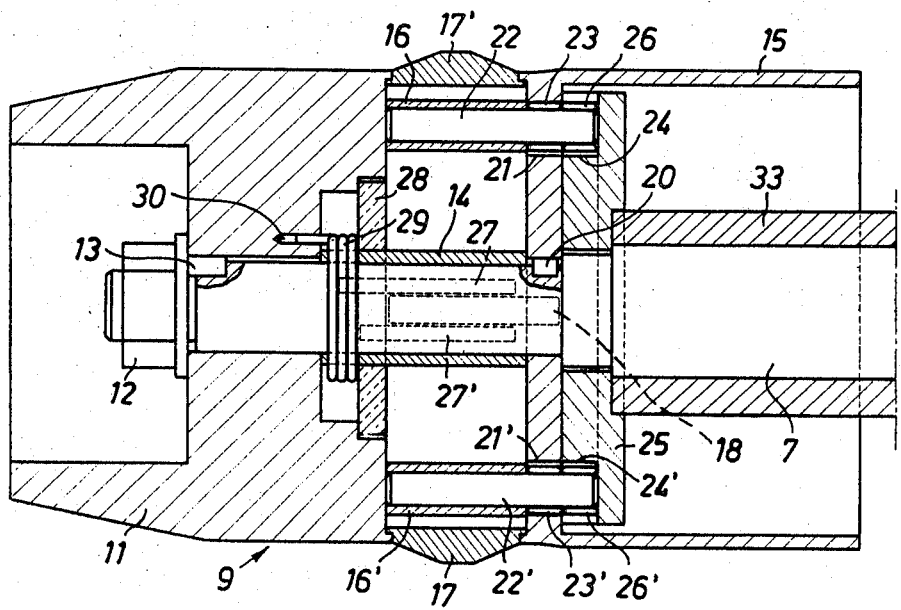
FIG. 2 shows a mandrel in longitudinal section.
Figure 3:
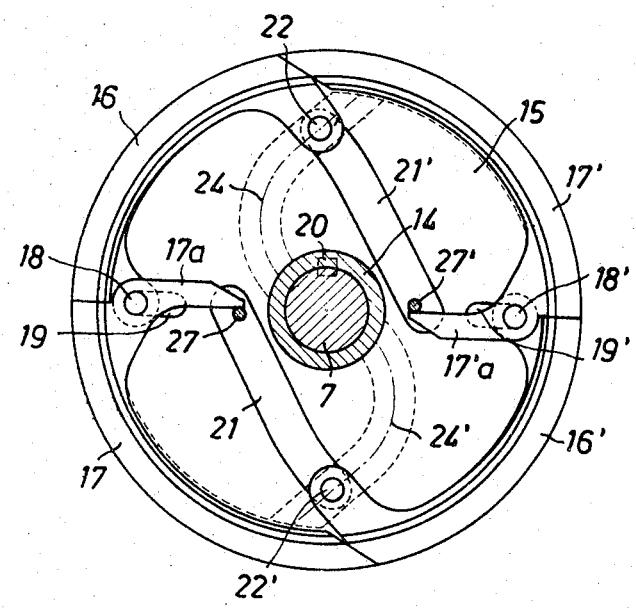
FIG. 3 show the mandrel with the four sector members comprising the rim in their extended position.

A sleeve 14 is passed over the shaft 7 and sandwiched between the end piece 11 and a drum 15 (FIGS. 2 and 3).

The space defined between the end piece and the drum houses four sector members 16, 16', 17, 17' adapted to form a continuous rim of trapezoidal cross-section.

The sector members are provided with elbows through which pivot pins 18 and 18' pass which are diametrically opposed about the axis of the shaft 7. The pivot pins 18 and 18' extend beyond the assembled sector members and are received in radial slots 19 and 19' formed in the bottom of the drum 15.

The drum 15 is fixed for movement with the shaft 7 by means of a key 20.

Generally straight slots 21 and 21' formed in the bottom of the drum 15 make angles of 60° with the diameter drawn through the axes of the pivot pins 18 and 18'. These slots have curved end portions having the pivot pins as their centres.

Pivot pins 22 and 22' extending through the slots 21 and 21' are inserted in the elbowed end portions of the sector members 16 and 16' and provided with needle bearings 23 and 23'. The ends of the pivot pins 22 and 22' are received in the grooves 24 and 24' milled in a disc fixed to the end of the sleeve 33. These ends are also provided with needle bearings 26 and 26' which, along with the needle bearings 23 and 23', facilitate the displacement of the pivot pins 22 and 22' in the grooves.

The centre line of the grooves 24 and 24' are aligned so as to form an S with portions extending from the axis of the shaft 7.

It is seen that pivot pins 22 and 22' may be guided simultaneously in the slots 21' and 21 and in the grooves 24 and 24' when the sleeve 33 drives disc 25 in rotation.

Figure 4:
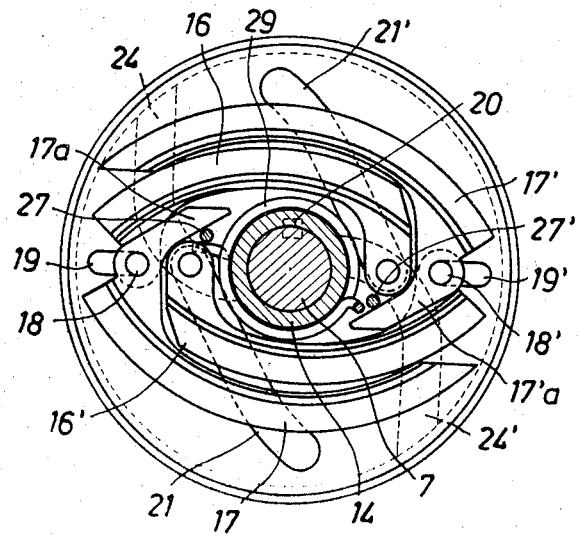
FIG. 4 illustrates the mandrel with the four sector members of the rim in retracted position.

The slots and grooves were designed so that the rotation of the drum produces the outwards expanding movement of the sector members bringing the latter to their operative position in which they form a continuous circular rim as shown in FIG. 3, or their inward retracting or folding movement to the rest or withdrawal position shown in FIG. 4.

During the retracting movement of the sector members, the pivot pins 18 and 18' slide in the slots 19 and 19' respectively thereby enabling the folding of the sector members in the space between the end piece 11 and the drum 15.

For facilitating the folding of the sector members to the rest position of the tool, two abutment pins or abutments 27 and 27' are fixed to a drive disc 28 housed in a bore of the end piece 11 and come into bearing contact against the fingers or projections 17a and 17'a radially extending on the sector members 17 and 17' by means of a coil spring 29 received on the shaft 7 and housed in the central bore of the end piece 11. One of the ends of the spring is received in a hole 30 in the end piece and the other end of the spring is in engagement with the drive disc 28 which drives the stop pins 27 in contact with the finger or projections 17a on the sector member 17.

The operation of the mandrel will be easily understood by examining FIGS. 3 and 4.

For bulging out the end of a tube of synthetic plastic material 31 (FIG. 1), the sleeve 33 and the shaft 7 pushed by the rod 8 of the jack brings the mandrel 9 into a preheated tube held facing an opening in the frame member 3. The rollers 32 support the mandrel 9 during its horizontal displacement relative to the carriage 1.

When the mandrel had bulged out the end of the tube 31 and has reached the end of its path of travel, the jack 4 effets the rotation of the sleeve 33 and and in turn the rotation of the disc 25 and the four sector members which, up to then were in their retracted position by the elements 24-22 and 21', are urged by the series of slots 21' and 21 and grooves 24 and 24' towards the periphery of the mandrel while outwardly forming or expanding a peripheral groove 31a in the tube.

The jack 4 then returns to its retracted position and the spring 29 returns the sector members 17 and 17' to the position shown in FIG. 4 by moving them against the abutment pins 27 and 27' in engagement with the projections or fingers 17a and 17'a.

The mandrel enables the bulging out and groove forming in large diameter tubes under industrial conditions.

The invention is applicable to the working of tubes of synthetic plastic material.

What I claim is:

1. A retractable mandrel for bulging out and forming an annular peripheral groove in plastic tubes, comprising a shaft mounted on a carriage, said carriage being displaceable for translatory movement along the longitudinal axis of the shaft, the shaft having a cylindrical end piece with a frusto-conical tip adapted to be inserted in a plastic tube, a drum keyed to the shaft, the shaft passing through the bottom of the drum, four rim-forming sector members adapted to form a complete circular rim, said sector members being pivoted in pairs about a first pair of slidable pivot pins arranged diametrically opposite each other for sliding movement in radial slots in the bottom of the drum, a second pair of slidable pivot pins fixed to diametrically opposed extremities of two of the sector members and passing through parallel slots also in the bottom of the drum, said second pair of pivot pins being received in grooves, said grooves forming together an S with portions extending from the axis of the shaft in a drive disc mounted for rotation, said grooves cooperating with said parallel slots for effecting the outward or expansive movement of the sector members in order to form an annular peripheral groove in the tube in a first direction of rotation of the disc and for retracting or folding the sector members over one another to each side of the line drawn between the axes of said first pair of pivot pins.

2. A retractable mandrel according to claim 1, wherein two sector members have projections in the vicinity of their respective pivot pins, said drive disc being housed in the end piece for rotation therein and having abutments mounted thereon, the projections bearing against the abutments, a coil spring being received on the shaft, one end of the coil spring bearing against one of the abutments (abutment pins), the other end of the coil spring being received in a hole in the end piece, whereby the coil spring biases the four sector members to the retracted position.

3. A mandrel according to claim 1, further comprising drive means for the drive disc including a gear wheel mounted for rotation on a sleeve, the sleeve being arranged around the shaft, and a gear rack adapted to be driven by a jack meshing with the gear wheel.

4. A mandrel according to claim 1, further comprising a jack for effecting the translatory movement of the shaft for inserting and withdrawing the mandrel into and out of the tube.

5. A retractable mandrel according to claim 1, wherein the cross section of the sector members forming a complete circular rim in their expanded position have trapezoidal cross-sections.

* * * * *